United States Patent
Kangasniemi et al.

(10) Patent No.: US 7,081,207 B2
(45) Date of Patent: Jul. 25, 2006

(54) METHOD FOR CLEANING A FILTER ELEMENT IN A FILTERING CHAMBER AND FILTER CARRYING OUT THE METHOD

(75) Inventors: Marko Kangasniemi, Vesilahti (FI); Tuomo Koivula, Tampere (FI)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/844,684

(22) Filed: May 14, 2004

(65) Prior Publication Data
US 2004/0238461 A1 Dec. 2, 2004

Related U.S. Application Data

(63) Continuation of application No. PCT/FI2002/000959, filed on Nov. 28, 2002.

(30) Foreign Application Priority Data
Nov. 29, 2001 (FI) .................................. 20012334

(51) Int. Cl.
*B01D 29/62* (2006.01)
*B01D 29/66* (2006.01)
(52) U.S. Cl. ........................ 210/798; 210/411; 210/921
(58) Field of Classification Search ................ 210/741, 210/768, 772, 791, 797, 798, 407, 408, 409, 210/411, 412, 416.1, 921
See application file for complete search history.

(56) References Cited

U.S. PATENT DOCUMENTS 2,784,846 A * 3/1957 Ebert et al. ............ 210/333.01
3,666,097 A * 5/1972 Ryan ........................ 210/798

(Continued)

FOREIGN PATENT DOCUMENTS

EP    0 303835 A1    2/1989

(Continued)

OTHER PUBLICATIONS

Copy of corresponding International Application Published Under the PCT, International Publication Number WO 03/045528 A1, dated Jun. 5, 2003.

*Primary Examiner*—Robert James Popovics
(74) *Attorney, Agent, or Firm*—Joseph J. Pophal; Daniel J. Whitman

(57) ABSTRACT

The invention relates to a method for cleaning a filter element (9) located in a filtering chamber (10, 11) and to a filter implementing the method. The filter includes an inlet (4) leading to the inlet side (10) of the filtering chamber, an outlet (6) starting from the outlet side (11) of the chamber, and a flow passage (13), which connects the chamber inlet side preferably to atmospheric pressure and by means of which a pressure difference can be generated between the different sides of the filter element in order to produce a flow impulse detaching solid matter accumulated on the element. In accordance with the invention, the inlet side (10) of the filtering chamber is connected in a first step to a confined buffer chamber (14) under lower pressure, the pressure equalisation between the chambers producing a flow impulse cleaning the filter element (9), after which the buffer chamber can be connected to atmospheric pressure. Such two-step pressure drop during cleaning of the filter element allows use of the elements in high-pressure hydraulic systems without exposing the element to risk of damage.

7 Claims, 1 Drawing Sheet

U.S. PATENT DOCUMENTS

| | | | | |
|---|---|---|---|---|
| 4,055,500 | A | * | 10/1977 | Parker .................. 210/412 |
| 5,017,241 | A | * | 5/1991 | Ryan .................... 134/22.12 |
| 5,114,596 | A | * | 5/1992 | Laterra ................. 210/798 |
| 5,437,788 | A | * | 8/1995 | Geibel et al. ......... 210/333.01 |
| 5,498,349 | A | * | 3/1996 | Kurahashi et al. ...... 210/798 |
| 5,766,486 | A | * | 6/1998 | Cathcart et al. ........ 210/739 |
| 5,906,751 | A | * | 5/1999 | Parker ................. 210/741 |
| 6,004,465 | A | * | 12/1999 | Uhr et al. ............. 210/651 |
| 6,439,273 | B1 | * | 8/2002 | Kruger et al. .......... 141/11 |
| 2002/0139738 | A1 | * | 10/2002 | Fujie et al. ........... 210/184 |
| 2004/0238461 | A1 | * | 12/2004 | Kangasniemi et al. .... 210/798 |
| 2006/0054541 | A1 | * | 3/2006 | Fujie et al. ........... 210/184 |

FOREIGN PATENT DOCUMENTS

| | | |
|---|---|---|
| FI | 107127 B | 6/2001 |
| JP | 8-19705 | 1/1996 |
| WO | WO 01/34274 A1 | 5/2001 |

* cited by examiner

METHOD FOR CLEANING A FILTER ELEMENT IN A FILTERING CHAMBER AND FILTER CARRYING OUT THE METHOD

CROSS REFERENCE TO RELATED APPLICATIONS

This application is a continuation of copending International Application No. PCT/FI2002/000959 filed 28 Nov. 2002, which designated the United States, and which claims priority to Finnish Patent Application FI-20012334, filed 29 Nov. 2001, the disclosures of which are incorporated herein by reference.

BACKGROUND OF THE INVENTION

The invention relates to a method for cleaning a filter element located in a filtering chamber, in which, after interruption of the filtering flow from the filtering chamber inlet side through the element to the outlet side of the chamber, the chamber inlet side is connected with a lower pressure in order to generate a pressure difference instantaneously between the inlet and outlet side of the element and in order to generate a flow impulse for detachment of solid matter accumulated on the element surface. Additionally, the invention relates to a filter to which said method is applicable.

Continuously operating automatic filters, whose operation is based on alternating filtering and backwashing steps, are used as fuel and lubricant filters in diesel engines, for instance. Filtering removes solid impurities from the flow being filtered, and the function of repeated flushing steps is to keep the filter element in operating condition.

A typical automatic filter comprises two or more filter elements coupled in parallel, each of which is located in an individual filtering chamber. The filter elements are used alternatingly, so that, while the flow to be filtered is being directed to the one element, the other element is cleaned by backwashing, until rotation of their common inlet valve for flow to be filtered reverses these operation steps.

Filtered liquid conducted from the filter outlet side can be used for backwashing of the filter elements, the liquid being under the operating pressure of the filter, i.e. under the pressure of the filtered discharge flow. Connecting the inlet side of the filtering chamber to lower pressure activates flushing, and then flushing takes place by means of the pressure difference between the operating pressure of the filter and said lower pressure. Usually the pressure difference is achieved by connecting the inlet side of the filtering chamber to atmospheric air pressure. A sudden pressure drop on the inlet side of the chamber generates a pressure difference between the inlet side and the outlet side of the filtering chamber, this pressure difference, in turn, generating a pulse in the flushing flow so that any solid impurities accumulated on the inlet side of the element surface are detached and washed out of the filter by the flow. Filters are used in which flushing takes place exclusively by means of a filtered liquid recovered on the filter outlet side, and also filters whose filtering chamber is emptied of liquid as the flushing step starts, after which flushing is continued by means of compressed air. FI lay-out print 107127, for instance, describes an automatic filter of the latter type, in which the filtering chamber has been connected with an air tank, the flushing air compressed in this tank enhancing the liquid discharge from the chamber at the beginning of each flushing step.

So far, automatic filters have been used in low and medium-pressure systems, in which the prevailing pressure is generally 20 bars at the most. The filter elements have been devised so as to resist a pressure difference of this order after the filtering chamber has been connected with atmospheric air at the beginning of the flushing period. At the same time, the pressure difference is sufficient for effective detachment of solid matter from the surface of the filter element. However, it would be desirable to be able to use automatic filters operating on the backwashing principle also in high-pressure hydraulic systems, whose typical operating pressure is of the order of 250 bars, for instance. Connecting a filtering chamber under such pressure to atmospheric pressure in order to achieve flushing, would, however, cause damage to the filter element. In order to resist a momentary pressure difference of 250 bars, the filter elements should be given a very durable construction, which would entail high costs. The pressure prevailing in the filtering chamber could be decreased gradually under control by means of pressure-measuring sensors and adjustable valves mounted in the reject duct for discharge from the chamber, yet this would entail complex and expensive constructions, and would still not easily allow for adequate repeatability accuracy of the pressure-drop steps. An occasional excess of the set value for the pressure drop could immediately result in damage to the filter element.

SUMMARY

The purpose of this invention is to provide a solution allowing automatic filtering in a high-pressure hydraulic system using current filter elements intended for low or medium pressure systems without complex control and valve systems exposed to malfunctions and without any risk of damage to the element. The element of the invention is characterised by the fact that, in order to clean the filter element, the filtering chamber is connected to a defined buffer chamber under lower pressure than the filtering chamber, so that pressure equalisation between the inlet side of the filtering chamber and the buffer chamber generates a pressure difference in the filtering chamber and a flow impulse between the different sides of the filter element.

Consequently, the essential feature of the invention is the controlled pressure drop taking place on the inlet side of the filtering chamber, the drop being determined by the pressure difference between the chambers before they are combined and by the mutual ratio between the chamber volumes. With the filtering chamber under the pressure of the filtering flow, i.e. the operating pressure of the system, at the starting moment, and the buffer chamber approximately under atmospheric pressure, the relative pressure drop outside the filtering chamber will depend exclusively on the mutual ratio between this and the volumes of the buffer chamber. The buffer chamber can thus be given dimensions corresponding to the pressure drop, so that the flow impulse it generates through the element is enough to detach solid matter and to clean the element, without the endurance of the element structure being at stake. When the operating pressure of the system has been stabilised, the invention has achieved in each cleaning cycle a controlled pressure drop having repeatability accuracy and not exposed to occasional malfunctions and damages entailed by these.

For the invention to be operational, there must be a sufficiently wide flow passage between the inlet side of the filtering chamber and the buffer chamber and a sufficiently large on/off valve controlling this to allow sudden pressure equalisation between the chambers by generating a pressure difference between the different sides of the filter element and a consequent flow impulse through the element, which detaches solid matter. Hence substantial pressure equalisation should take place in less than a second and preferably even in less than 0.5 second. The valve orifice, which can be opened by a simple rotational movement, preferably has a width equal to that of the connecting pipe, and then the valve will not produce throttling or any similar obstacle to rapid pressure equalisation.

In high-pressure systems, the pressure drop sufficient for detaching solid matter from the filter element is typically very low compared to the operating pressure of the system. A pressure drop of a few bars may be sufficient in order to achieve the desired cleaning effect. This means that the buffer chamber volume is preferably only a fraction of the inlet side volume of the filtering chamber, e.g. from 1 to 10%, depending on the operating pressure. On the other hand, as a consequence of the low pressure drop, the filtering chamber will be under a high pressure close to the operating pressure even after the chambers have been combined, and this requires pressure release and removal of detached solid matter from the filtering chamber performed under control, without causing damage to the filter element. Hence the discharge flow should be arranged with a sufficiently slow and regular pressure drop, the operation period being at least tenfold, preferably even hundredfold compared to the first pressure drop generating the cleaning flow impulse. Hence the period of pressure release from the filtering chamber can be calculated as at least 10 seconds and even as about 1 minute or more in typical high-pressure systems.

In order to remove detached solid matter from the filtering chamber, a slow and controlled flushing flow can be conducted through the chamber into a direction opposite to the filtering direction, the flushing flow being removed through the buffer chamber from the filter. The width of the reject duct for discharge from the buffer chamber and/or the on/off control valve provided in this should be narrow enough for adequate blocking of the pressure drop in accordance with the purposes above. Instead of a valve, the duct may be equipped with standard or adjustable throttling, and in that case detaching and removal of solid matter from the filtering chamber take place without interruption.

The filter in accordance with the invention, which allows controlled cleaning of the filter element described above, comprises as components known per se a filtering chamber, a filter element lodged in a filtering chamber and dividing this chamber into an inlet and outlet side, an inlet for flow to be filtered on the inlet side of the chamber, a discharge pipe for filtered flow on the outlet side of the chamber, and a flow passage connecting the inlet side of the chamber to lower pressure during cleaning of the element for sudden generation of a pressure difference between the different sides and for generating a flow impulse detaching solid matter accumulated on the element surface. In accordance with the invention, the filter is characterised by comprising a defined buffer space, which can be brought to a pressure lower than the pressure prevailing in the filtering chamber, and which can be connected over said flow passage to the filtering chamber for pressure equalisation between the inlet side of the filtering chamber and the buffer chamber and for generating a pressure difference between the different sides of the filter element.

The invention is explained in further detail below by means of an example and with reference to the accompanying drawing, which illustrates an automatic filter of the invention comprising two filter elements coupled in parallel.

DETAILED DESCRIPTION OF THE PREFERRED EMBODIMENTS

Figure 1:
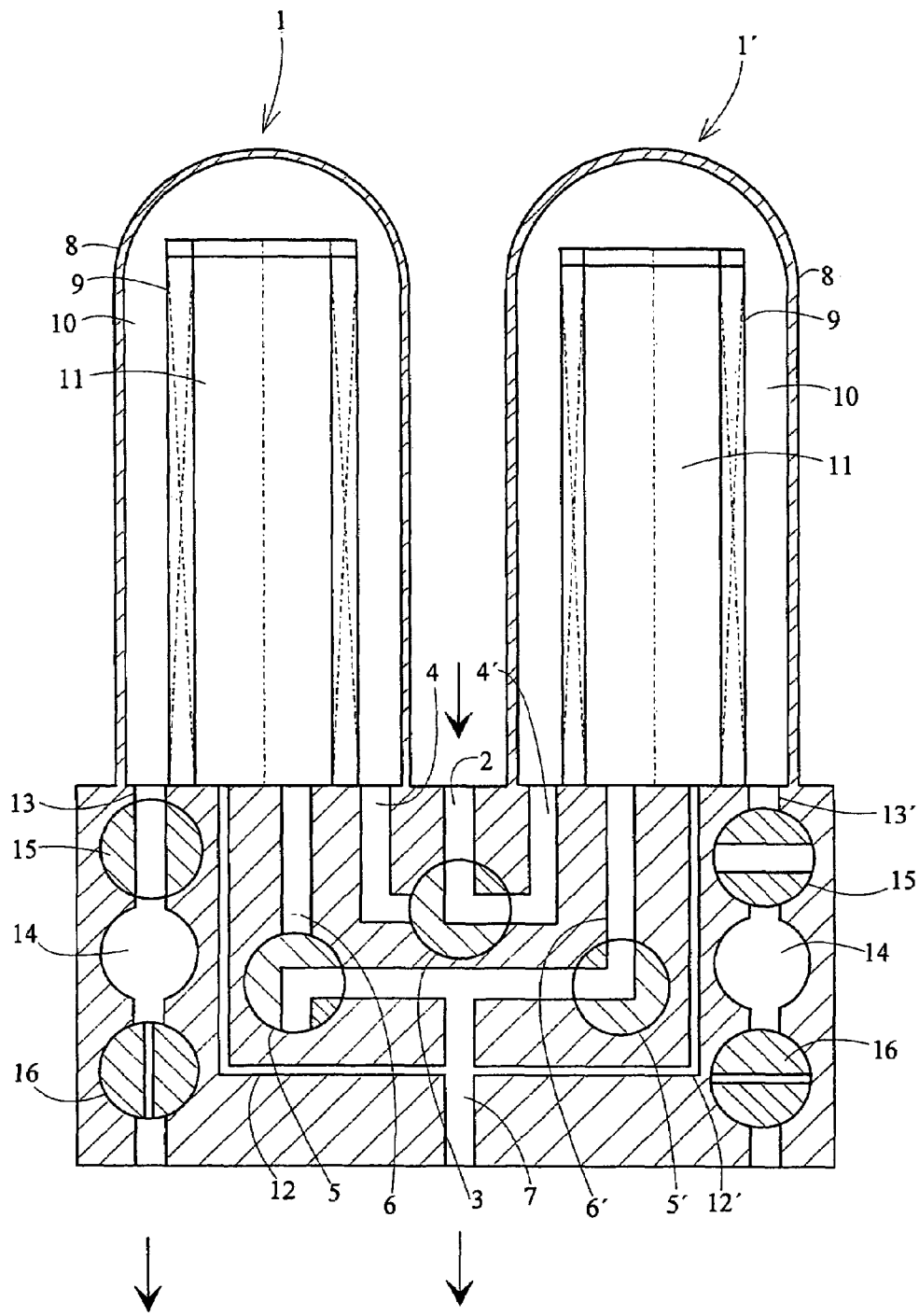
FIG. 1 is partial sectional view of the present invention showing two filtering units coupled in parallel.

The filter shown in the FIG. 1 is formed of two filtering units 1, 1' coupled in parallel, which are disposed for alternating operation such that, while the one unit 1' on the right in the figure is operating, the second unit 1, on the left in the figure, is in the cleaning step. The inlet duct 2 of the liquid flow to be filtered comprises a valve 3, which guides the flow to the filtering unit currently operating through the connecting ducts 4, 4' leading to these. Each filtering unit 1, 1' further comprises a duct 6, 6' equipped with a valve 5, 5' for discharge of filtered flow, the ducts joining to form a common discharge duct 7 from the filter.

Both filtering units 1, 1' include a filtering chamber defined by a housing 8, in which a cylindrical filter element 9 made of metal mesh has been disposed. The filter element 9 divides the filtering chamber into an inlet side 10 and an outlet side 11, with the former located outside the element mantle and the latter inside the element mantle. In both the filtering units 1, 1', the inlet duct 4, 4' for flow to be filtered leads outside the mantle of the filter element 9, and accordingly, the duct 6, 6' for discharge of filtered flow starts from the inside of the mantle. Filtering takes place through the mantle of the filter element 9, so that the principally solid impurities contained in the liquid flow will be retained on the outer surface of the mantle.

The cleaning of the filter elements 9 pertaining to the filtering units 1, 1' is based on backwashing by means of filtered liquid having passed through the element mantle. A narrow flushing duct 12, 12' has been conducted from the common discharge duct 7 for filtered flow to the two filtering unit 1, 1' on the outlet side 11 of the filtering chamber, with a view to achieve a flushing flow through the element in a direction opposite to the filtering flow. In the embodiment shown in the drawing, the flushing ducts 12, 12' are continually open, however, if desired, they can be equipped with a valve or an adjustable throttle for control or interruption of the flushing flow.

For cleaning of the filter element 9, both the filtering units 1, 1' are still connected to outdoor air under normal pressure from the inlet side 10 of the filtering chamber over the reject duct 13, 13'. In accordance with the invention, the reject duct 13, 13' is equipped with a buffer chamber 14, whose volume constitutes a determined fraction of the volume of the inlet side 10 of the filtering chamber. On both sides of the buffer chamber 14, the duct 13 is equipped with on/off valves 15, 16 so as to provide a broad valve between the filtering chamber and the buffer chamber, the valve orifice equaling the width of the duct 13, whereas the valve 16 between the buffer chamber and outdoor air has a markedly narrowed orifice. The purpose of the valve dimensioning is that opening of the valve 15 produces rapid, almost instant pressure equalisation between the inlet side 10 of the filtering chamber and the buffer chamber 14 filled with liquid under lower pressure, whereas opening of the valve 16 between the buffer chamber and outdoor air allows only slow and controlled release of the pressure in the buffer chamber and the filtering chamber into the atmosphere.

The specific purpose of the buffer chamber 14 in the described filter of the invention is to produce a momentary pressure difference between the different sides 10, 11 of the filtering chamber by a sudden drop of the pressure on the inlet side 10 of the filtering chamber, so that the resulting flow impulse through the element mantle makes the solid matter accumulated during filtering detach from the element surface. If the operating pressure in the filtering chamber 10, 11 before opening of the valve 15 between the chamber inlet side 10 and the buffer chamber 14 is e.g. 250 bars and the buffer chamber is approx. under atmospheric pressure, a buffer chamber having a volume of ⅟₅₀ of the volume of the filtering chamber inlet side 10 produces a momentary difference of approx. 5 bars between the different sides of the filter element 9, which is enough for removal of solid matter from the element without causing a risk of damage to the element. If a higher pressure drop on the inlet side 10 of the filtering chamber is desired, the buffer chamber 14 is given accordingly larger dimensions, and vice versa. Further, with a lower operating pressure of the system, the buffer chamber 14 should be given larger dimensions in order to produce a given pressure drop. The dimensioning parameters are selected for each individual case according to these principles.

Immediately after connection of the inlet side 10 with the filtering chamber and after the buffer chamber 14 has generated a flow impulse detaching solid matter, the valve 16 between the buffer chamber and the atmosphere is opened, allowing flushing flow through the flushing duct 12 and the filtering chamber 10, 11 by means of filtered liquid into a direction opposite to the filtering flow. This flushing flow carries solid matter detached from the filter element in the filtering chamber through the reject duct 13 and out of the filter. Because the filtering chamber and the buffer chamber are almost under the operating pressure of the system as the flow starts, the valve 16 connecting the buffer chamber to atmospheric air should be narrow enough for blocking the release of high pressure into the atmosphere and for preventing the filter element 9 from breaking at this stage. The dimensioning of the valve 16 may be such, for instance, that the pressure of the filtering chamber drops gradually during about one minute to a value close to atmospheric pressure. Owing to the continually open flushing duct 12, a given slight overpressure relative to atmospheric pressure is still maintained in the filtering chamber.

In the drawing, the filtering unit 1' on the right of the filter is in the filtering step, the valve 3 of the inlet duct 2, 4' for flow to be filtered being open in the direction of this filtering unit and the liquid to be filtered, such as oil or fuel, for instance, flowing to the inlet side 10 of the filtering chamber, into the space defined by the cylindrical mantle of the filter element 9 and the housing 8. From here, the liquid to be filtered is filtered through the mantle of the filter element 9 into the element to the outlet side 11, while the solid impurities contained in the liquid are retained on the outer surface of the element. The filtered liquid is discharged from the filtering chamber 11 to the discharge duct 6', 7, whose valve 5' is open as shown in the drawing. The reject duct 13' leading from the filtering chamber to the atmosphere is meanwhile closed. The left-hand filtering unit 1 of the filter, in turn, is in the filtering step, during which the inlet duct 4 for liquid to be filtered leading to this and the discharge duct 6 for filtered flow leading away from this are closed by valves 3, 5. The valves 15, 16 of the reject duct 13 leading away from the inlet side 10 of the filtering chamber are open, so that purified and filtered liquid from the discharge duct 7 is allowed to wash the filtering chamber 10, 11 and the filter element 9 through the duct 12. This backwashing step is preceded by the connection of the inlet side 10 of the filtering chamber and the buffer chamber 14 in order to generate a flow impulse detaching solid matter having adhered to the element 9.

The switch of functions between the filtering units 1, 1' is performed by closing first the valves 15 and 16 of the reject duct 13 of the left-hand unit 1, and then a low pressure slightly above atmospheric pressure prevails in the buffer chamber 14. Subsequently, the valves 3, 5 of the inlet and outlet ducts 4, 6 are turned in order to activate the filtering flow through said unit 1. At the same time, the inflow of the right-hand filtering unit 1' is interrupted, and also the valve 5' of the outlet duct 6 of the unit 1' is closed. The cleaning of the right-hand unit 1' is then started when the valve 15 of the reject duct 13' is opened so as to connect the inlet side 10 of the filtering chamber with the buffer chamber 14 under low pressure, the sudden pressure drop and the generated pressure difference between the different sides 10, 11 of the filter element 9 detaching solid matter from the element surface. After this, the valve 16 between the buffer chamber 14 and the atmosphere is opened, so that the flushing flow through the flushing duct 12', the filtering chamber and the reject duct 13' washes away detached solid matter from the filter.

It is obvious to those skilled in the art that the embodiments of the invention are not limited to the example given above, but may vary within the scope of the accompanying claims. Thus, for instance, the valve 16 between the buffer chamber 14 and the atmosphere can be replaced with a stationary or adjustable throttle so as to keep the buffer chamber continually communicating with the atmosphere. This yields the advantage that opening of the valve 15 between the filtering chamber and the buffer chamber not only produces a flow impulse detaching solid matter in the filtering chamber, but also automatically activates the flushing flow through the filtering chamber. Flushing can also be performed by means of flushing air conducted from a separate feed pipe, and in that case the filter can be equipped with an air tank, which is pressurised at the stage of filling the filtering chamber, as described in FI patent specification 107127.

The invention claimed is:

1. A method of cleaning a filter element (9) located in a filtering chamber comprising the steps of:
   a. interrupting the filtering flow from an inlet side (10) of said filtering chamber through said element (9) to an outlet side (11) of said chamber;
   b. connecting said filtering chamber inlet side (10) with a confined buffer chamber (14) having a lower pressure than said filtering chamber so that pressure equalization between said filtering chamber inlet side (10) and said buffer chamber (14) occurs;
   c. generating a pressure differential instantaneously between the different sides of said element (9); and
   d. detaching solid matter accumulated on said element (9) surface with a flow impulse.

2. A method as defined in claim 1, wherein before being connected to the buffer chamber, the filtering chamber (10, 11) is under the filtering flow.

3. A method as defined in claim 1, wherein before being connected to the filtering chamber (10, 11), the buffer chamber (14) is under a low pressure substantially equal to atmospheric pressure.

4. A method as defined in claim 3, wherein the substantial pressure equalization between the filtering chamber inlet side (10) and the buffer chamber (14) is disposed to occur in less than a second, preferably less than 0.5 second.

5. A method as defined in claim 1, wherein after the solid matter has been detached, the filtering chamber (10, 11) is connected to free atmospheric pressure.

6. A method as defined in claim 5, wherein the pressure drop of the filtering chamber (10, 11) connected to the atmosphere occurs gradually so as to take at least 10 seconds.

7. A method as defined in claim 1, wherein after the solid matter has been detached, a flushing flow is conducted through the filtering chamber (10, 11) into a direction opposite to the filtering in order to remove solid matter from the filtering chamber.

* * * * *